Aug. 20, 1963    E. F. GROH    3,101,309
FASTENER FOR AN ASSEMBLY OF PLATES
Filed Jan. 25, 1962
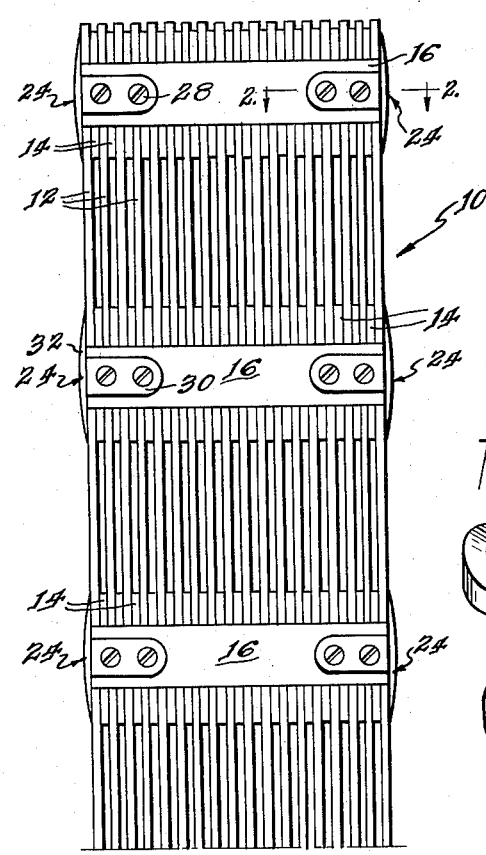
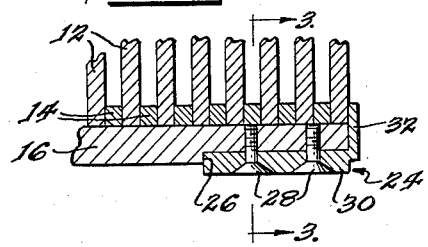
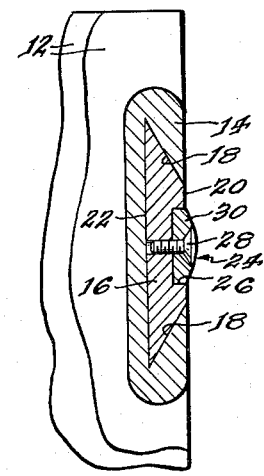
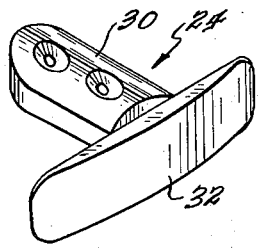
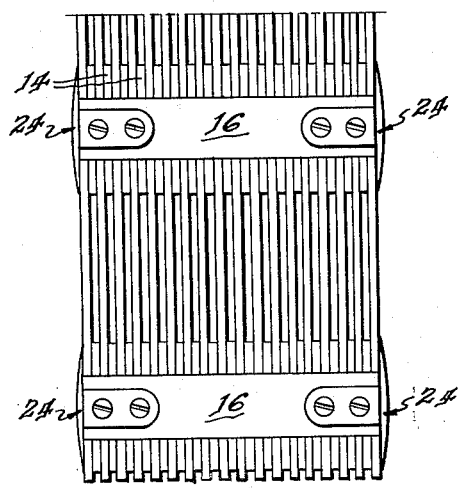
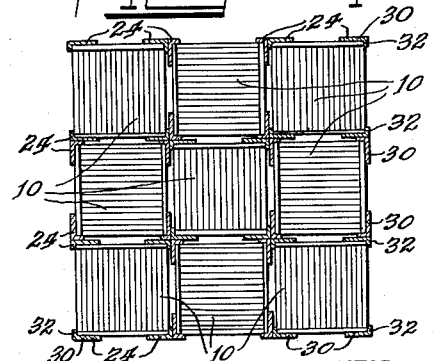
INVENTOR.
Edward F. Groh
BY
Roland A. Anderson
Attorney 3,101,309
FASTENER FOR AN ASSEMBLY OF PLATES
Edward F. Groh, Naperville, Ill., assignor to the United States of America as represented by the United States Atomic Energy Commission
Filed Jan. 25, 1962, Ser. No. 168,854
3 Claims. (Cl. 204—193.2)

This invention relates to a compact assembly of plates and more particularly to the mechanical securement of fuel plates in an assembly for use in a nuclear reactor.

It is well known in the nuclear-reactor art to secure thin fuel plates in spaced parallel relationship by welding, brazing, or soldering. Some sort of metal bonding of fuel plates may be dictated by the need to obtain sufficiently rigid assemblies.

Where limited bonding is used to assemble such fuel plates, it is usually necessary to use fairly bulky frames, forms, or boxes to obtain rigidity. However, one advantageous assembly of spaced parallel plates having a minimum of extraneous neutron-absorbing material and a minimum of welding is that described and claimed in the copending Groh et al. application, Serial No. 168,856, filed January 25, 1962, and now U.S. Patent 3,086,935, entitled "An Assembly of Parallel Plates."

The present invention is an improvement on the assembly described in the above application, in that this invention eliminates all need for welding or bonding. The present invention also makes it possible to remotely disassemble and reassemble such fuel element assemblies, to remove a defective fuel plate, and to modify the make-up of a fuel element assembly without destroying or damaging any of the components involved.

The present invention further eliminates need for individual support grids to space fuel elements in a nuclear reactor.

The present invention in addition provides means for accurately spacing assemblies apart from each other while minimizing sliding friction during assembly operations.

Other advantages of this invention will be apparent from the description and the drawing in which:

FIG. 1 is an elevation of a fuel-plate assembly of the present invention;

FIG. 2 is a sectional view taken on line 2—2 of FIG. 1;

FIG. 3 is a sectional view taken on line 3—3 of FIG. 2;

FIG. 4 is a sectional view of a number of fuel element assemblies showing inter-assembly spacing; and FIG. 5 is a perspective view of a spacing retainer forming part of the present invention.

As shown in FIGS. 1 and 4, an assembly 10 comprises spaced parallel plates 12, spacers 14 positioned between plates 12, and keys 16 inserted in registered undercut keyways in both plates and spacers, the keyways being typified by keyway 18 in spacer 14 in FIG. 3. Each key 16 as shown in cross section in FIG. 3 has two parallel sides 20 and 22 of which the outer shorter side 20 is coincident with the side edges of plates 12 and spacers 14. The keys 16 are about as long as the width of the assembly of plates 12 and spacers 14 as shown in FIG. 1 and in FIG. 2.

A rigid assembly has been obtained, without bonding, by attaching a plurality of spacing retainers 24, one to each end of each key 16. As shown in FIGS. 2 and 3, each spacing retainer 24 fits in a groove 26 formed in the shorter side 20 of the key 16 and is secured to the key by screws 28, which pass through a body portion 30 of the retainer and are threaded into the key.

As shown in FIGS. 2 and 5, each of the spacing retainers 24 also has a terminal portion 32, which extends at right angles to the body portion 30 in the plane of the end of the key 16 into overlapping relationship with outermost plate 12 of the assembly 10. The retainers 24 have proven to be a highly effective means for rigidly securing the parallel plates 12 to one another.

The terminal portions 32 and body portions 30 preferably have convex shapes which minimize obstruction to fluid flow around the spacing retainers, and also make it possible to slide one assembly longitudinally relative to adjacent assemblies without snagging. The convex portions of the spacing retainer 24 extend outward from the key 16. Convexity will be understood as referring to the shape of a section taken longitudinally of the assembly through the respective portions of the spacing retainers 24.

It will be apparent from the drawing and especially from FIG. 4 in the drawing that when a number of assemblies 10 are constructed in accordance with the present invention, the spacing retainers 24 not only secure each assembly 10, but also bear against each other thereby positively spacing the assemblies when seated, without need for spacing grids.

The present invention eliminates sustained sliding friction between assemblies 10 during insertion in such installations as nuclear reactors, and at the same time provides an unusual gaging effect wherein clearance between assemblies 10 is checked each time spacing retainers 24 meet those of adjacent assemblies 10 during insertion.

The convex portions 30 and 32 of the spacing retainers 24 are preferably such that each occupies one half of the desired space between adjacent parallel plates 12 when the parallel plates include nuclear reactor fuel material. In this manner uniform cooling is promoted between assemblies 10, and at the same time maximum protection is afforded against the development of hot spots due to shifting or warping of plates 12 or assemblies 10.

Highly satisfactory structural strength has been attained by the present invention without resorting to any of the conventional welding or bonding normally used where rigid construction is essential. This has been accomplished with a seemingly frail fitting which embodies the dual roles of retainer and inter-assembly spacer.

Fuel-plates assemblies 10 constructed according to this invention may be disassembled remotely by manipulators by merely removing the screws 28 which hold the spacing retainers 24 in place. Damaged or defective plates may be removed remotely without destruction of the entire fuel assembly. Keys 16, spacers 14, plates 12, and spacing retainers 24 may all be reused if desired. This permits flexibility in making up fuel-element assemblies 10 in experimental work where thickness, spacing, and composition are variables to be explored.

It will be understood that the invention described herein may be modified within the scope of the appended claims.

What is claimed is:

1. In an assembly comprising parallel plates having a plurality of registered keyways opening in side edges of the plates, spacers located between successive plates and provided with keyways in register with the keyways in the plates, and keys inserted in the keyways, the keyways being undercut to keep the keys from moving laterally out of the keyways, the combination with the outermost plates and the keys, of a plurality of spacing retainers removably attached one to each end of each of said keys, each of said spacing retainers having a convex body portion and a convex terminal portion at right angles thereto, said terminal portion being extended in the plane of the end of the key into overlapping relationship with the outermost plate, each of said convex portions being extended outwardly from the key and being convex in sections taken longitudinally of the assembly.

2. The improvement of claim 1 wherein each of said convex portions is extended outwardly from the key a distance equal to one half of the space between adjacent parallel plates.

3. In an assembly comprising parallel plates having a plurality of registered keyways opening in side edges of the plates, spacers located between successive plates and provided with keyways in register with the keyways in the plates, and keys inserted in the keyways, the keyways being undercut to keep the keys from moving laterally out of the keyways, the combination with the outermost plates and the keys, of a plurality of spacing retainers removably attached one to each end of each of said keys, the lateral outer face of each key having a recess adjacent each end receiving one of the spacing retainers, and fastening elements passing through the spacing retainers and threaded into the keys beyond the bottoms of the recesses, each of said spacing retainers having a convex body portion and a convex terminal portion at right angles thereto, said terminal portion being extended in the plane of the end of the key into overlapping relationship with the outermost plate, each of said convex portions being extended outwardly from the key and being convex in sections taken longitudinally of the assembly.

References Cited in the file of this patent
UNITED STATES PATENTS

| | | |
|---|---|---|
| 224,486 | Spruce | Feb. 10, 1880 |
| 1,354,998 | Paulson | Oct. 5, 1920 |
| 2,989,456 | Jessen | June 20, 1961 |
| 3,029,198 | Anderson et al. | Apr. 10, 1962 |
| 3,067,994 | Ronbeck | Dec. 11, 1962 |
| 3,070,527 | Hurford et al. | Dec. 25, 1962 |